ASYNCHRONOUS BINARY COUNTER REGISTER STAGE WITH FLIP-FLOP AND GATE UTILIZING PLURALITY OF INTERCONNECTED (NOR) LOGIC CIRCUITS

Original Filed Sept. 27, 1962

INVENTOR
GEORGE T. OSBORNE
BY Charles T. Johnson
ATTORNEY

United States Patent Office

Re. 26,082
Reissued Sept. 20, 1966

26,082

ASYNCHRONOUS BINARY COUNTER REGISTER STAGE WITH FLIP-FLOP AND GATE UTILIZING PLURALITY OF INTERCONNECTED (NOR) LOGIC CIRCUITS

George T. Osborne, St. Paul, Minn., assignor to Sperry Rand Corporation, New York, N.Y., a corporation of Delaware Original No. 3,139,540, dated June 30, 1964, Ser. No. 226,524, Sept. 27, 1962. Application for reissue June 4, 1965, Ser. No. 462,787
11 Claims. (Cl. 307—88.5)

Matter enclosed in heavy brackets [ ] appears in the original patent but forms no part of this reissue specification; matter printed in italics indicates the additions made by reissue.

This invention relates generally to binary data processing devices and more particularly to circuits for use as bistable stages in binary register devices such as counters, frequency dividers, and the like.

A general object of this invention is to provide a switchable bistable stage for a binary register device comprising a plurality of interconnected NOR circuits.

A further object of this invention is to provide a scale-of-two counter comprising a plurality of interconnected NOR circuits.

A further object of this invention is to provide a bistable stage for an asynchronous binary counter register.

In the embodiment of this invention which is described in detail hereinbelow, a plurality of NOR circuits each having multiple inputs and multiple outputs are interconnected in a manner to provide a bistable flip-flop and a gating circuit for controlling the switching or toggling of the flip-flop in response to a count or switching signal to serve as a stage for a binary register or counter or the like. The circuitry is identical for each NOR circuit except for the number of inputs and outputs of each. Because of this identity of circuitry, the design of the binary register device incorporating stages under the teachings of this invention is simplified. Additionally, since the NOR circuits are duplicated except for the number of inputs and outputs, a binary register device incorporating stages under the teachings of this invention is implemented at a reduced cost.

Since a binary register comprising a plurality of stages as taught by this invention is readily adaptable to asynchronous operation, there results a reduction in the complexity and cost of providing control such as required in synchronous counters.

Yet another object of this invention is to provide a pulse responsive scale-of-two counter in which wider tolerances on the pulse width of the counting pulses are allowable.

These and other more detailed and specific objects and features will be disclosed in the course of the following specification, reference being had to the accompanying drawings, in which.

Figure 3A:
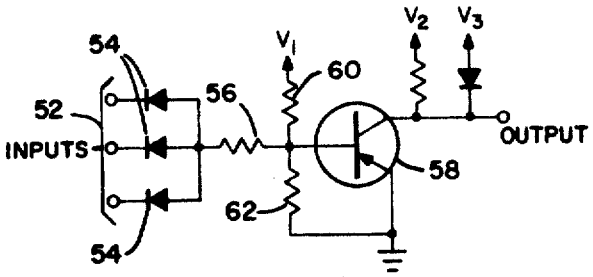
FIG. 3a shows illustrative circuitry for use in the NOR circuits of the embodiment shown in FIG. 1.
Figure 3B:
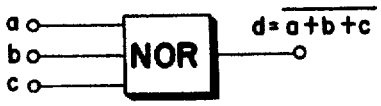

FIG. 3b describes the logical symbol of the NOR circuits utilized in this invention.

Although throughout the following specification the operation of the invention will be described generally in terms of binary values of "0" and "1," it should be understood that in the implementation of the invention these binary values actually are represented by signals. For illustrative purposes, it will be assumed that a binary "0" value is represented by a high level signal of approximately ground or zero volts, and a binary "1" value is represented by a low level signal of approximately −3 volts. Obviously, other signal representations of the binary values can be utilized and the foregoing are intended to be only illustrative and not limitive.

The logical operation of the NOR circuits in this invention can be stated by the well known rule that if any input to a NOR circuit is a "1," the output will be a "0" and only if all inputs are "0's" will the output be a "1."

This is illustrated in FIG. 3b which shows the output, d, equal to the negative of the three OR inputs, a, b and c, as $d=\overline{a+b+c}$.

Figure 1:
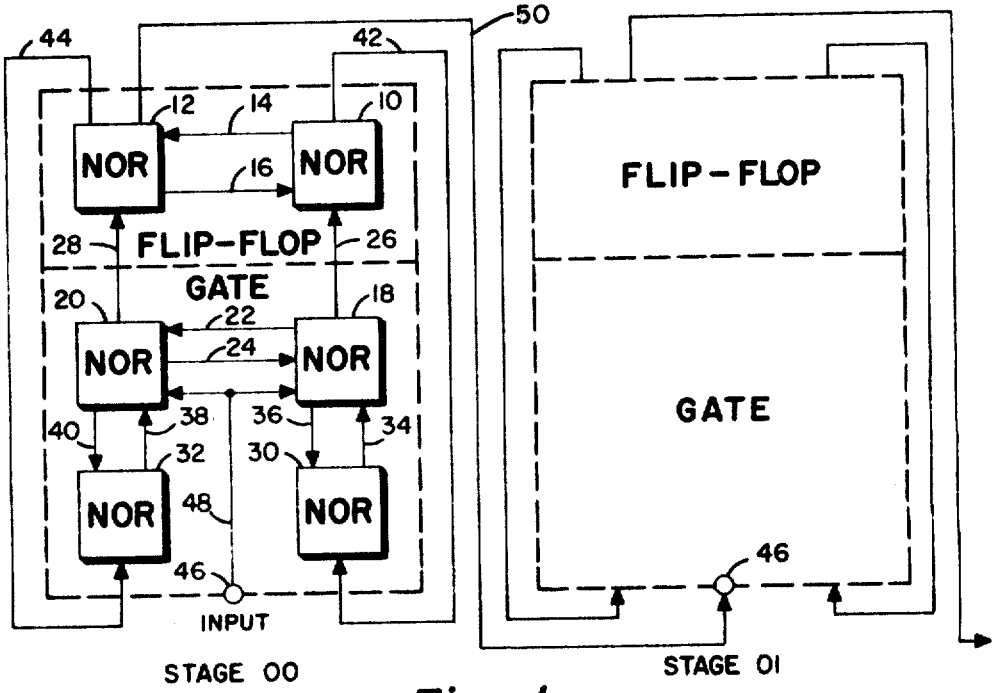
FIG. 1 shows a two-stage counting register incorporating the embodiment of this invention in each of the stages.

Referring now to FIG. 1, there is shown two stages respectively labeled Stage 00 and Stage 01 of a binary counter in which each stage incorporates the embodiment of this invention. Only Stage 00 is shown in detail since the arrangement of the NOR circuits in Stage 01 is identical to that of Stage 00. By dashed line the flip-flop portion of each of the stages is shown separate from the gate circuit portion. The flip-flop comprises a first pair of NOR circuits 10 and 12 which are cross-coupled by an output from NOR 10 on lead 14 providing an input to NOR 12 and an output from NOR 12 on lead 16 providing an input to NOR 10. For illustrative purposes, it can be assumed that NOR 12 represents the CLEAR side of the flip-flop and NOR 10 represents the SET side of the flip-flop. When the flip-flop is in the SET condition, NOR 10 outputs a binary "0" and NOR 12 outputs a binary "1" and when the flip-flop is in the CLEAR condition NOR 12 outputs a binary "0" and NOR 10 outputs a binary "1."

In the gate circuit portion of Stage 00 a further pair of NOR circuits, 18 and 20, are cross-coupled with an output from NOR 18 appearing on lead 22 as an input to NOR 20 and an output from NOR 20 on lead 24 providing an input to NOR 18. The further output from NOR 18 on lead 26 provides an input to the SET side, NOR 10, of the flip-flop and an output from NOR 20 on lead 28 provides an input to the CLEAR side, NOR 12, of the flip-flop.

A still further pair of NOR circuits, NOR 30 and 32, is included in the gate circuit. NOR 30 is cross-coupled with NOR 18 by an output from the former on lead 34 serving as an input to the latter and an output from NOR 18 on lead 36 providing an input to NOR 30. NOR 32 is cross-coupled with NOR 20 with an output from the former providing an input to the latter via lead 38 and the latter providing an input to the former via lead 40.

The further interconnections within the stage include an output from the SET side, NOR 10, of the flip-flop providing an input to NOR 30 via lead 42 and an output from the CLEAR side of the flip-flop, NOR 12, on lead 44, providing a further input to NOR 32. Input terminal 46 is connected to the input of NOR 20 and NOR 18 via lead 48. And, finally, an output from the CLEAR side of the flip-flop, NOR 12, is transmitted to the input terminal of Stage 01, which is numbered 46 since it is identical to the input terminal of Stage 00, via lead 50.

Figure 2:
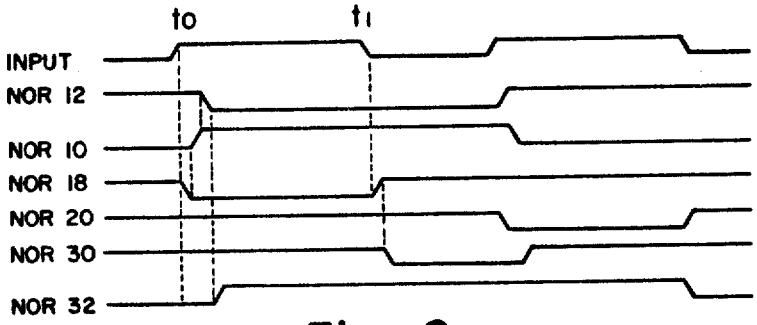
FIG. 2 shows the output signals of each of the NOR's in FIG. 1 in response to applied input signals.

The operation of this invention can best be understood with reference to the circuit arrangement shown in FIG. 1 along with the binary value signal outputs of the respective NOR circuits as shown in FIG. 2. Initially, assume the flip-flop, comprising the cross-coupled NOR circuits 10 and 12, is in the CLEAR condition so that NOR 12 outputs a high level signal indicative of a "0" and NOR 10 outputs a low level signal indicative of a binary "1." Further assume that the input signal appearing at input terminal 46 is a low level signal indicative of a binary "1." Since the cross-coupled NOR circuits 18 and 20 in the gate portion of Stage 00 both receive binary "1" signals from the input terminal via lead 48, they in turn output binary "0" signals in accordance with the previously stated rule that a NOR will output a "0" if any input is a "1." NOR 30, which receives a binary "1" input signal via lead 42 from NOR 10 must also therefore output a binary "0" and NOR 32 which has both of its inputs, via lead 44 from NOR 12 and via lead 40 from NOR 20, as binary "0's" will output a binary "1" on lead 38.

When the input signal at terminal 46 changes to a binary "0," as shown at $t_0$ in FIG. 2, all of the inputs to NOR 18 are then of binary "0" values so that the latter changes state to output a binary "1." The "1" output from NOR 18 to NOR 30 via lead 36 and a further output to NOR 20 via lead 22 causes the latter two NOR's to remain in the same state, outputting a binary "0." The further output from NOR 18 which provides an input to the SET side of the flip-flop, NOR 10, via lead 26 causes the flip-flop to toggle or switch to its other state so that NOR 10 outputs a "0" and NOR 12 outputs a "1." The "1" output from NOR 12, which provides an input to NOR 32 via lead 44, causes the latter to output a binary "0."

When the input at terminal 46 reverts to the low level signal of a binary "1," as shown at $t_1$ in FIG. 2, it causes NOR 18 to change state to output a "0" which in turn results in both inputs to NOR 30 being binary "0's" so that it outputs a binary "1." All of the remaining NOR circuits remain in their previously existing conditions and the gate circuit is then in condition to allow the next subsequent change of the input from a binary "1" to a binary "0" to effect a toggling of the flip-flop to its opposite state. It can be seen then that the flip-flop goes through one complete toggling cycle, that is, from the CLEAR to the SET condition and back again, in response to every two changes of the input signal from a binary "1" to a binary "0."

A feature of special interest in the operation of the invention described above should be noted. With the flip-flop initially in the CLEAR condition, a low level binary "1" signal at the input terminal 46 holds the output of NOR 18 to a binary "0" so that when the input changes to the high level or binary "0" signal, the output of NOR 18 changes to a binary "1" which effects the toggling of the flip-flop via the SET input on lead 26. It should be noted, then, that the flip-flop can only be switched to the SET condition upon NOR 18 outputting a binary "1" and the latter condition is in response to the input signal changing from a "1" to a "0." Toggling of the flip-flop from the SET back to the CLEAR condition is effected by NOR 20 going from the "0" to the "1" output state to provide a CLEAR input to the flip-flop on lead 28. Similar to the immediately foregoing description of toggling to the SET condition through NOR 18, it is the change from "1" to "0" of the input signal received at the input terminal 46 which causes NOR 20 to change to the state of outputting a "1" to effect clearing of the flip-flop. In the same manner that NOR's 18 and 20 alternately toggle the flip-flop in response to successive change of the input signal from the "1" to "0" signal levels, NOR's 30 and 32 alternately change from the "0" outputting state to the "1" outputting state in response to successive changes of the input signal from "0" to "1" signal levels. These latter two may be considered as controlling signals to control the alternate change in state of NOR's 18 and 20 and in themselves do not effect toggling of the flip-flop. Therefore, it can be seen that erroneous toggling of the flip-flop due to pulses of excessive width cannot occur since each toggle is dependent upon the input pulse changing from "1" to "0" and the gating control of the toggling is effected by change in the input signal from "0" to "1."

As regards the narrowness of the input pulse signals and the repetition rate, it is obvious that since the NOR circuits do have inherent delays, some specifications must be placed upon same. If the total circuit response delay time is designated $T_c$ it has been found that extremely reliable operation has been achieved provided that the pulse width is $3T_c$ or greater and that successive changes of the input signals from "1" to "0" signal levels are separated by $6T_c$ or more. In a particular circuit utilized in an embodiment of this invention which has been reliably operated in the manner described $T_c \leqslant 130$ [mono-seconds] *nanoseconds.*

The signal waveforms shown in FIG. 2 are somewhat idealized although they do show some sloping of the rise and fall portions to indicate the relative response of each of the NOR circuits to the respective signal inputs. It should be noted that there is no time scale in FIG. 2 since it is used to describe asynchronous operation. The only timing relationship is with regard to the effect of a change in state of each of the NOR's on others of the respective NOR's. It has been found empirically that due to the variations in the inherent characteristics of the NOR circuitry, that in extreme cases the rise and fall times of the applied signal may effect erroneous operation. It any given situation where this would be the case, obviously a pulse sharpening circuit, such as a Schmitt trigger, could be utilized to shape the input pulse.

The output from the CLEAR side of the flip-flop on lead 50 which is transmitted to input terminal 46 of Stage 01 and the output from the CLEAR side of the flip-flop of Stage 01 providing the input to the next successive higher order stage provides the arrangement whereby a plurality of stages can be connected together to form an asynchronous counter register. The toggling of the flip-flops in each of the stages is only dependent upon the change of the respective input signals from the "1" to the "0" level so that no clocking is required.

The flip-flop in Stage 01 will go through one complete toggling cycle, that is, from the CLEAR to the SET and back again for every four changes of the input signal to Stage 00 from the "1" to the "0" condition.

Referring now to FIG. 3a, there is shown illustrative circuitry for the NOR circuits. The three input terminals, labeled collectively as 52, are each respectively coupled through the ORing diodes 54 and resistor 56 to the base electrode of transistor 58. The base biasing and drive circuitry includes voltage source V1 and resistors 60 and 62 connected between V1 and ground or zero potential level. V2 is coupled through a current limiting resistor to the collector electrode of the transistor and V3 with its associated diode provides a clamping action on the collector output signal. The emitter electrode of the transistor is connected to ground. If any of the input terminals receives a low level signal of a binary "1," transistor 58 conducts since the base element is driven more negative than the emitter to pull the collector to a high signal level of substantially ground, indicative of a binary "0." It should be understood that the circuitry of FIG. 3a is solely illustrative and not limitive and that other circuits, such as those utilizing NPN transistors, with corresponding changes in the polarity of the applied voltages along with changes in the respective signal indications of binary "1" and binary "0" can be utilized within the teachings of this invention.

It is understood that suitable modifications may be made in the structure as disclosed providing such modifications come within the spirit and scope of the appended claims. Having now, therefore, fully illustrated and described my invention, what I claim to be new and desire to protect by Letters Patent is:

[What is claimed is:]

1. For use in a binary register, in combination:

(a) a first pair of two-state NOR circuits cross-coupled to form a bistable flip-flop in which the NOR circuits are in opposite states;

(b) a second pair of cross-coupled two-state NOR circuits;

(c) a third pair of two-state NOR circuits, each cross-coupled with respectively different NOR circuits of the second pair;

(d) means coupling the output of each of the NOR circuits of the first pair to the input of respectively different NOR circuits of the third pair;

(e) means coupling the output of each of the NOR circuits of the second pair to the input of respectively different NOR circuits of the first pair;

(f) and an input terminal connected to the input of each NOR circuit of said second pair.

2. For use in a binary register, in combination:

(a) a bistable flip-flop switchable to a set and a clear condition, comprising,
  a pair of cross-coupled NOR circuits,
  a set input,
  a clear input,
  a set output,
  and a clear output;

(b) a gating circuit for controlling the switching of said flip-flop, comprising,
  a further pair of cross-coupled NOR circuits,
  an output of one of said further pair coupled to said clear input and an output of the other of said further pair coupled to said set input;

(c) a still further pair of NOR circuits, one of said still further pair cross-coupled with said one of said further pair and the other of said still further pair cross-coupled with the other of said further pair;

(d) means coupling said clear ouput to an input of the one of said still further pair;

(e) means coupling said set output to an input of the other of said still further pair;

(f) and an input terminal coupled to an input of each of said further pair.

3. For use in a binary register, in combination:

(a) first, second and third pairs of multiple-input, multiple-output, two-state NOR circuits;

(b) means coupling a first output of one of the first pair to a first input of the other of said first pair;

(c) means coupling a first input of said one of the first pair to a first output of the other of said first pair;

(d) means coupling a first output of one of the second pair to a first input of the other of said second pair;

(e) means coupling a first input of said one of the second pair to a first ouput of the other of said second pair;

(f) means coupling a first output of one of said third pair to a second input of said one of said second pair;

(g) means coupling a first input of said one of said third pair to a second output of said one of said second pair;

(h) means coupling a first output of the other of said third pair to a second input of the other of said second pair;

(i) means coupling a first input of the other of said third pair to a second output of the other of said second pair;

(j) means coupling a second input of said one of said first pair to a third output of said one of said second pair;

(k) means coupling a second input of said other of said first pair to a third output of said other of said second pair;

(l) means coupling a second output of said one of said first pair to a second input of said one of said third pair;

(m) means coupling a second output of the other of said first pair to a second input of the other of said third pair;

(n) an input terminal;

(o) and means coupling said input terminal to a third input of each of said second pair.

*4. A bistable register stage comprising:*

*a first bistable flip-flop circuit alternatively switchable to a set and clear operating condition, said flip-flop including a first pair of cross-coupled logic circuits, a set input circuit, a clear input circuit, a set output circuit, and a clear output circuit;*

*an input gating flip-flop, said gating flip-flop including a second pair of cross-coupled logic circuits and having a first output circuit coupled to said set input circuit and a second output circuit coupled to said clear input circuit, said gating flip-flop further including means for receiving switching input signals, and first and second control input circuits;*

*first control means for coupling said set output circuit to said first control input circuit; and*

*second control means for coupling said clear output circuit to said second input circuit.*

*5. A bistable register stage comprising:*

*a bistable flip-flop circuit alternatively switchable to a set and clear operating condition, said flip-flop including a first pair of cross-coupled logic circuits, a set input circuit, a clear input circuit, a set output circuit, and a clear output circuit;*

*a gating circuit for controlling the switching of said flip-flop, said gating circuit including a second pair of cross-coupled logic circuits, an output circuit of one of said second pair coupled to said clear input circuit and an output circuit of the other of said second pair coupled to said set input circuit;*

*a third pair of logic circuits, each circuit of said third pair having input and output circuits, one of said third pair cross-coupled with one of said second pair and the other of said third pair cross-coupled with the other of the second pair;*

*means coupling said clear output circuit to an input circuit of the one of said third pair;*

*means coupling said set output circuit to an input circuit of the other of said third pair; and*

*means for receiving input signals coupled to an input circuit of each of said second pair.*

*6. For use in a binary register, in combination:*

*(a) a first pair of two-state logic circuits cross-coupled to form a bistable flip-flop in which the logic circuits are operatively in opposite states;*

*(b) a second pair of cross-coupled two-states logic circuits;*

*(c) a third pair of two-state logic circuits, each cross-coupled with respectively different logic circuits of the second pair;*

*(d) means coupling the output of each of the logic circuits of the first pair to the input of respectively different logic circuits of the third pair;*

*(e) means coupling the output of each of the logic circuits of the second pair to the input of respectively different logic circuits of the first pair; and*

*(f) an input terminal connected to the input of each logic circuit of said second pair.*

*7. For use in a binary register, in combination:*

*(a) a bistable flip-flop switchable to a set and a clear condition, comprising,*
  *a pair of cross-coupled logic circuits,*
  *a set input,*
  *a clear input,*
  *a set output,*
  *and a clear output;*

*(b) a gating circuit for controlling the switching of said flip-flop, comprising,*
  *a further pair of cross-coupled logic circuits,*
  *an output of one of said further pair coupled to said clear input and an output of the other of said further pair coupled to said set input;*

*(c) a still further pair of logic circuits, one of said still further pair cross-coupled to said one of said further pair and the other of said still further pair cross-coupled with the other of said further pair;*

(d) means coupling said clear output to an input of the one of said still further pair;

(e) means coupling said set output to an input of the other of said still further pair; and (f) an input terminal coupled to an input of each of said further pair.

8. For use in binary register, in combination:

(a) first, second and third pairs of multiple-input multiple-output-two-state logic circuits;

(b) means coupling a first output of one of the first pair to a first input of the other of said first pair;

(c) means coupling a first input of said one of the first pair to a first output of the other of said first pair;

(d) means coupling a first output of one of the second pair to a first input of the other of said second pair;

(e) means coupling a first input of said one of the second pair to a first output of the other of said second pair;

(f) means coupling a first output of one of said third pair to a second input of said one of said second pair;

(g) means coupling a first input of said one of said third pair to a second output of said one of said second pair;

(h) means coupling a first output of the other of said third pair to a second input of the other of said second pair;

(i) means coupling a first input of the other of said third pair to a second output of the other of said second pair;

(j) means coupling a second input of said one of said first pair to a third output of said one of said second pair;

(k) means coupling a second input of said other of said first pair to a third output of said other of said second pair;

(l) means coupling a second output of said one of said first pair to a second input of said one of said third pair;

(m) means coupling a second output of the other of said first pair to a second input of the other of said third pair;

(n) an input terminal; and (o) means coupling said input terminal to a third input of each of said second pair.

9. A bistable register stage comprising:

a first bistable flip-flop circuit alternately switchable to a set and clear operating condition, said flip-flop including a first pair of cross-coupled logic circuits, each of said logic circuits having a plurality of logical input and output circuits, said input circuits including a set input circuit and a clear input circuit, and said output circuits including a set output circuit and a clear output circuit;

an input gating flip-flop, said gating flip-flop including a second pair of cross-coupled logic circuits, each of said second pair of logic circuits having a plurality of logical input and output circuits, and having a first of said gating flip-flop output circuits coupled to said set input circuit and a second of said gating flip-flop output circuits coupled to said clear input circuit, said gating flip-flop further including means for receiving switching input signals, and first and second control input circuits coupled respectively to different ones of said second pair for receiving feedback control signals;

first control means coupled to said set output circuit and to one of said second pair of logic circuits for providing feedback signals to said gating flip-flop; and second control means coupled to said clear output circuit and to the other of said second pair of logic circuits.

10. A gating control circuit for use in combination with a bistable storage flip-flop, said flip-flop having set and clear input circuits, and set and clear output circuits, the gating and control circuits including in combination:

a first pair of two-state logic circuits, each having input and output circuits, said first pair of logic circuits having respective input and output circuits cross-coupled for forming a bistable gating flip-flop, said first pair of logic circuits including an input terminal coupled to another of the input circuits of each of said first pair of logic circuits for receiving switching signals, and the output circuits of each of said first pair of logic circuits including an output terminal for coupling to a respectively associated one of the set and clear input terminals of a storage flip-flop; and a second pair of two-state logic circuits, each having input and output circuits cross-coupled with respectively different input and output circuits of said first pair of logic circuits, said second pair of logic circuits including respectively different control-signal input circuits for receiving control signals indicative of the state of an asssociated storage flip-flop.

11. A gating and control circuit for use in a binary register for controlling a bistable storage circuit having set and clear input circuits for switching said storage circuit to one of its stable states and set and clear output circuits for providing signals indicative of the state of said storage circuit, the gating and control circuit having in combination:

(a) first and second pairs of two-state logic circuits, each of said logic circuits having multiple-input circuits and multiple-output circuits;

(b) means coupling a first output circuit of one of the first pair of logic circuits to a first input circuit of the other of said first pair of logic circuits;

(c) means coupling a first input circuit of said one of the first pair to a first output circuit of the other of said first pair of logic circuits;

(d) means coupling a first output circuit of one of said second pair of logic circuits to a second input circuit of said one of said first pair of logic circuits;

(e) means coupling a first input circuit of said one of said second pair of logic circuits to a second output circuit of said one of said first pair of logic circuits;

(f) means coupling a first output circuit of the other of said second pair of logic circuits to a second input circuit of the other of said first pair of logic circuits;

(g) means coupling a first input circuit of the other of said second pair of logic circuits to a second output circuit of the other of said first pair of logic circuits;

(h) means for receiving a first feedback control signal coupled to a second input circuit of said one of said second pair of logic circuits;

(i) means for receiving a second feedback control signal coupled to a second input circuit of the other of said second pair of logic circuits;

(j) an input terminal; and (k) means coupling said input terminal to a third input circuit of each of said first pair of logic circuits.

References Cited by the Examiner

The following references, cited by the Examiner, are of record in the patented file of this patent or the original patent.

UNITED STATES PATENTS

| | | | |
|---|---|---|---|
| 2,816,237 | 12/1957 | Hageman | 307—88.5 |
| 2,977,485 | 3/1961 | Olsen | 307—88.5 |
| 3,114,049 | 12/1963 | Blair | 307—88.5 |
| 3,131,317 | 4/1964 | Yee | 307—88.5 |

ARTHUR GAUSS, *Primary Examiner.*

S. D. MILLER, *Assistant Examiner.*

Dedication

Re. 26,082.—*George T. Osborne*, St. Paul, Minn. ASYNCHRONOUS BINARY COUNTER REGISTER STAGE WITH FLIP-FLOP AND GATE UTILIZING PLURALITY OF INTERCONNECTED (NOR) LOGIC CIRCUITS. Reissue Patent dated Sept. 20, 1966. Dedication filed Oct. 10, 1966, by the assignee, *Sperry Rand Corporation*.

Hereby dedicates to the Public the remaining term of said patent.

[*Official Gazette January 24, 1967.*]